United States Patent
Greenwell et al.

(10) Patent No.: US 11,655,614 B2
(45) Date of Patent: May 23, 2023

(54) HYDRAULIC TRANSMISSION SYSTEM WITH CONFIGURABLE VIRTUAL GEARS

(71) Applicant: CNH Industrial America LLC, New Holland, PA (US)

(72) Inventors: Richard Leigh Greenwell, Wichita, KS (US); Van Jameson Hall, Garden Plain, KS (US); David R. Natzke, Wichita, KS (US); Joshua Zimmerman, Willow Springs, IL (US)

(73) Assignee: CNH Industrial America LLC, New Holland, PA (US)

( * ) Notice: Subject to any disclaimer, the term of this patent is extended or adjusted under 35 U.S.C. 154(b) by 201 days.

(21) Appl. No.: 17/133,788

(22) Filed: Dec. 24, 2020

(65) Prior Publication Data

US 2022/0205220 A1    Jun. 30, 2022

(51) Int. Cl.
*E02F 9/22* (2006.01)
*F16H 61/462* (2010.01)
*F16H 61/421* (2010.01)

(52) U.S. Cl.
CPC .......... *E02F 9/2253* (2013.01); *E02F 9/2235* (2013.01); *E02F 9/2296* (2013.01); *F16H 61/462* (2013.01); *F16H 61/421* (2013.01)

(58) Field of Classification Search
CPC ......... E02F 9/2253; F16H 61/46; F16H 61/47
See application file for complete search history.

(56) References Cited

U.S. PATENT DOCUMENTS

| | | | |
|---|---|---|---|
| 6,099,273 A | 8/2000 | Allart et al. | |
| 7,310,943 B2 | 12/2007 | Burgart et al. | |
| 8,834,317 B2 | 9/2014 | Wang et al. | |
| 8,849,527 B2* | 9/2014 | Davis | B60W 10/103 477/107 |
| 8,874,332 B2 | 10/2014 | Davis et al. | |
| 9,435,104 B2* | 9/2016 | Juricak | B60W 50/082 |
| 2014/0121918 A1 | 5/2014 | Davis et al. | |
| 2016/0201798 A1 | 7/2016 | Kikkawa et al. | |
| 2016/0205863 A1 | 7/2016 | Nafziger et al. | |
| 2016/0208458 A1 | 7/2016 | Juricak et al. | |

FOREIGN PATENT DOCUMENTS

| | | |
|---|---|---|
| DE | 102015208015 A1 | 11/2016 |
| DE | 102015225524 A1 | 6/2017 |

OTHER PUBLICATIONS

Extended European Search Report for EP Application No. 21216692.0 dated May 17, 2022 (six pages).

* cited by examiner

*Primary Examiner* — Michael Leslie
(74) *Attorney, Agent, or Firm* — Peter Zacharias

(57) ABSTRACT

A hydraulic system for a work vehicle includes a hydraulic motor configured to generate rotational power for one or more wheels on the work vehicle. The hydraulic system also includes a hydraulic pump coupled to the hydraulic motor, wherein the hydraulic pump is configured to pump hydraulic fluid to the hydraulic motor. The hydraulic control system includes a processor that is configured to receive an input indicative of a selection of a number of speed ranges that span between a minimum speed and a maximum speed for the work vehicle and to provide a motor command to set a motor volume of the hydraulic motor and a pump command to set a limit for a pump volume of the hydraulic pump to enable the number of speed ranges for the work vehicle.

19 Claims, 5 Drawing Sheets

US 11,655,614 B2

HYDRAULIC TRANSMISSION SYSTEM WITH CONFIGURABLE VIRTUAL GEARS

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A hydraulic system may include a hydraulic pump that pressurizes a hydraulic fluid to generate a pressurized hydraulic fluid, which may then be used to perform various tasks. A work vehicle (e.g., an agricultural vehicle and/or a construction vehicle, such as a skid steer) may include the hydraulic system. In such cases, the pressurized hydraulic fluid may be used to actuate a hydraulic motor that generates rotational power to drive one or more wheels of the work vehicle.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a hydraulic system for a work vehicle includes a hydraulic motor configured to generate rotational power for one or more wheels on the work vehicle. The hydraulic system also includes a hydraulic pump coupled to the hydraulic motor, wherein the hydraulic pump is configured to pump hydraulic fluid to the hydraulic motor. The hydraulic control system includes a processor that is configured to receive an input indicative of a selection of a number of speed ranges that span between a minimum speed and a maximum speed for the work vehicle and to provide a motor command to set a motor volume of the hydraulic motor and a pump command to set a limit for a pump volume of the hydraulic pump to enable the number of speed ranges for the work vehicle.

In one embodiment, a hydraulic control system for a work vehicle includes a processor that is configured to receive a configuration input from an operator indicative of a selection of a first number of speed ranges that span between a minimum speed and a maximum speed for the work vehicle. The processor is also configured to receive a first shift input from the operator indicative of a request to shift to a first speed range of the first number of speed ranges. The processor is further configured to provide a pump command to set a limit for a pump volume to a first limit to enable the first speed range of the first number of speed ranges.

In one embodiment, a method of operating a hydraulic system for a work vehicle includes receiving, at one or more processors, an input indicative of a selection of a first number of speed ranges that span between a minimum speed and a maximum speed for the work vehicle. The method includes adjusting, using the one or more processors, a motor volume of a hydraulic motor, a limit for a pump volume of a hydraulic pump, or both to enable the number of speed ranges. The method also includes receiving, at the one or more processors, an additional input indicative of an additional selection of a second number of speed ranges that span between the minimum speed and the maximum speed for the work vehicle. The method further includes adjusting, using the one or more processors, the motor volume of the hydraulic motor and the limit for the pump volume of the hydraulic pump to enable the second number of speed ranges.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
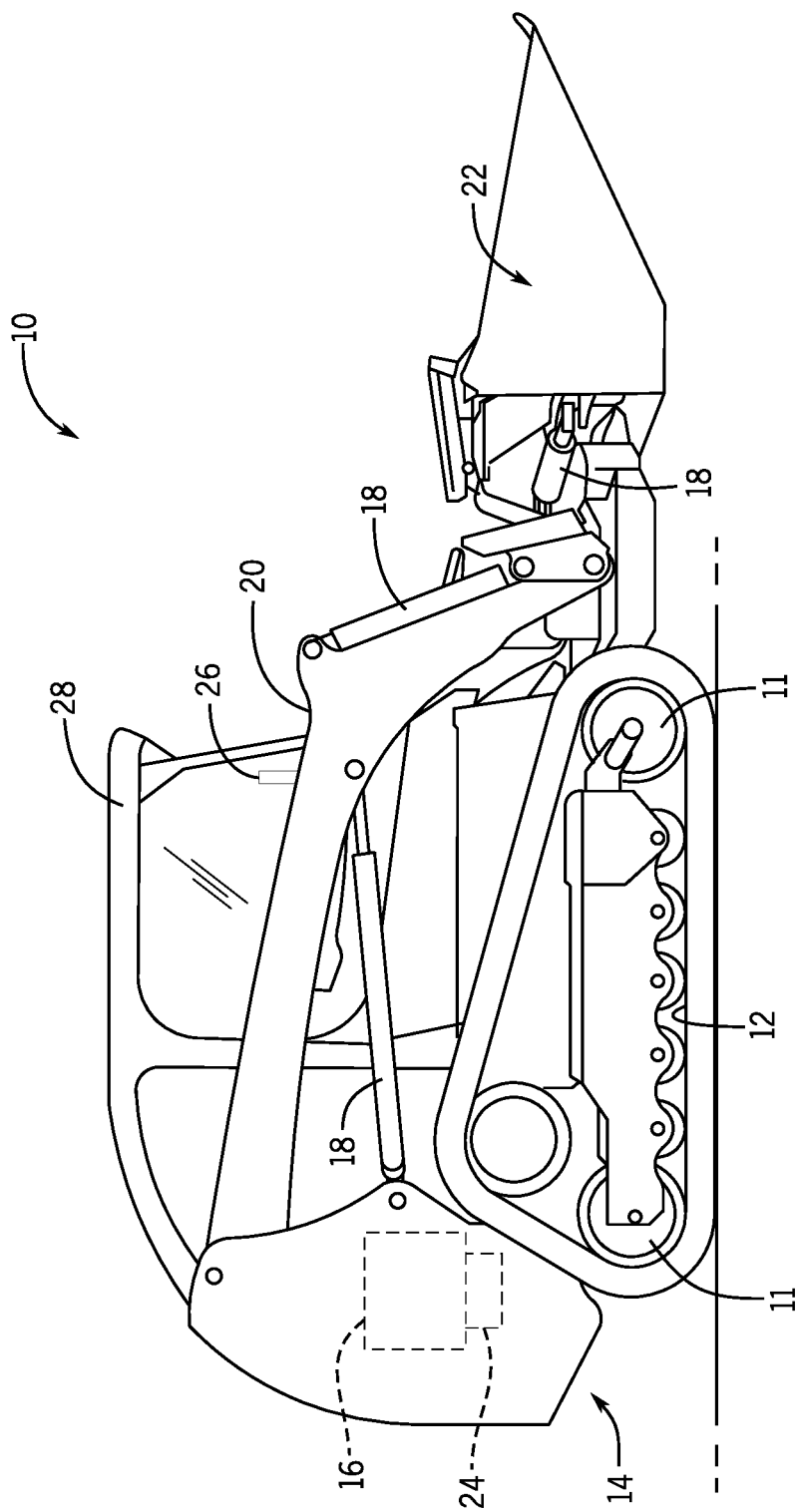
FIG. 1 is a side view of a work vehicle, in accordance with an embodiment of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B. Numerical terms, such as "first," "second," "third," and "fourth," are used to distinguish elements to facilitate discussion, and it should be noted that the numerical terms may be used differently or assigned to different elements in the claims.

Work vehicles (e.g., agricultural vehicles; construction vehicles, such as a skid steer) may include one or more hydraulic systems that provide power to complete various tasks. These various tasks may include loading, lifting, pushing, rotating, dozing, and/or moving the work vehicle. For example, a work vehicle may include a hydraulic system that includes one or more hydraulic motors that drive wheels of the work vehicle. The wheels in turn couple to tracks, which enable the work vehicle to traverse various types of terrain. An operator may want to adjust a speed range for the work vehicle depending on the task and/or the terrain. To change the speed range for the work vehicle (e.g., between a first speed range, such as a lower speed range, and a second speed range, such as a higher speed range), the operator may provide a shifting command via one or more input devices (e.g., a switch). The shifting command may cause the hydraulic system to increase or to decrease a hydraulic motor volume of the one or more hydraulic motors.

As an example, in some work vehicles with two-speed hydraulic motors, the shifting command may cause the hydraulic system to adjust each of the hydraulic motors from a first motor volume (e.g., a higher volume; for the first, lower speed range) to a second motor volume (e.g., a lower volume; for the second, higher speed range). The operator may provide a drive command via one or more input devices (e.g., a joystick) to adjust a flow rate of hydraulic fluid from one or more hydraulic pumps to the one or more hydraulic motors that have the second motor volume. When the flow rate of hydraulic fluid is unchanged (e.g., is at a particular flow rate for a given position of the one or more input devices), the change to the motor volume from the first motor volume to the second motor volume causes the motor speed to increase to allow the hydraulic fluid (e.g., at the particular flow rate) to pass through the second motor volume.

It is presently recognized that it would be desirable to make additional speed ranges for the work vehicle (e.g., for the work vehicle having two-speed hydraulic motors) available to the operator. Furthermore, it is presently recognized that it would be desirable to make the additional speed ranges adjustable (e.g., selectable, configurable) by the operator and/or to limit physical, mechanical changes to the work vehicle (e.g., to implement the additional speed ranges using existing components, such as the hydraulic motors and the hydraulic pumps; to implement the additional speed ranges via virtual gears that are established using a controller carrying out a software program stored in a memory).

Accordingly, the present disclosure relates generally to a hydraulic system (e.g., configurable hydraulic system) that includes configurable virtual gears (e.g., pseudo gears; gear ratios) to enable the operator to establish any number of speed ranges (e.g., 1, 2, 3, 4, 5, 6 or more) for the work vehicle. For example, the operator may select (e.g., via a graphical user interface displayed in the work vehicle) a number of virtual gears that are overlaid onto (e.g., used together with) mechanical gears (e.g., hydro-mechanical gears; gear ratios) to provide a total number of gears and corresponding speed ranges for the work vehicle. As a more specific example, the operator may select two virtual gears that are overlaid onto two mechanical gears (e.g., the two mechanical gears that would provide two speed ranges without the virtual gears) to provide a total of four gears and four speed ranges for the work vehicle. It should be appreciated that each of the gears corresponds to a respective speed range for the work vehicle, and thus, the terms "gears" and "speed ranges" may be used to describe operational features of the hydraulic system. A minimum speed and a maximum speed for the work vehicle may be unchanged by the addition of the virtual gears. Instead, the number of speed ranges provided between (e.g., that span between to include) the minimum speed and the maximum speed may vary to provide varying levels of control (e.g., finer control options with a higher number of speed ranges, as opposed to only coarser control options with a lower number of speed ranges) using the one or more input devices (e.g., the joystick).

FIG. 1 is a side view of an embodiment of a work vehicle 10 (e.g., a skid steer). The work vehicle 10 may include wheels 11 and tracks 12 that enable the work vehicle 10 to move. The work vehicle 10 includes an engine 14 that provides power to a hydraulic system 16. The hydraulic system 16 in turn provides power to the wheels 11, which then rotate the tracks 12. The hydraulic system 16 may also provide power to other systems on the work vehicle 10. For example, the hydraulic system 16 may provide power to hydraulic actuators 18 (e.g., hydraulic cylinders) that control operation of one or more arms 20 (e.g., booms). The arms 20 couple to a tool 22 that enable the work vehicle 10 to perform various tasks. For example, the tool 22 may be a fork, bucket, plow, blade, among others. In the illustrated embodiment, the tool 22 is a bucket that enables the work vehicle 10 to perform loading tasks. The tool 22 may instead be (e.g., changed to) a blade to perform dozing tasks and/or the tool 22 may instead be (e.g., changed to) another type of tool for another type of task.

As discussed in more detail below, the hydraulic system 16 may include one or more hydraulic pumps and one or more hydraulic motors that provide power to the wheels 11 on the work vehicle 10. In order to enable an operator of the work vehicle 10 to adjust a number of speed ranges available during operation of the work vehicle 10, the work vehicle 10 includes a hydraulic control system 24. As will be explained below, the hydraulic control system 24 controls operation of the one or more hydraulic pumps and the one or more hydraulic motors on the work vehicle 10 based on various inputs from the operator to provide the number of speed ranges selected by the operator. The operator may utilize one or more input devices 26 (e.g., touchscreen display, knobs, switches, joystick) within a cab 28 of the work vehicle 10 to provide the various inputs. For example, the operator may utilize one of the input devices 26 (e.g., touchscreen display) to provide the various inputs to set the number of speed ranges. The operator may utilize one of the input devices 26 (e.g., switch) to switch between the speed ranges, and the operator may utilize one of the input devices 26 (e.g., joystick) to adjust a flow rate of hydraulic fluid from the one or more hydraulic pumps to the one or more motors to thereby adjust the speed within a current speed range.

Figure 2:
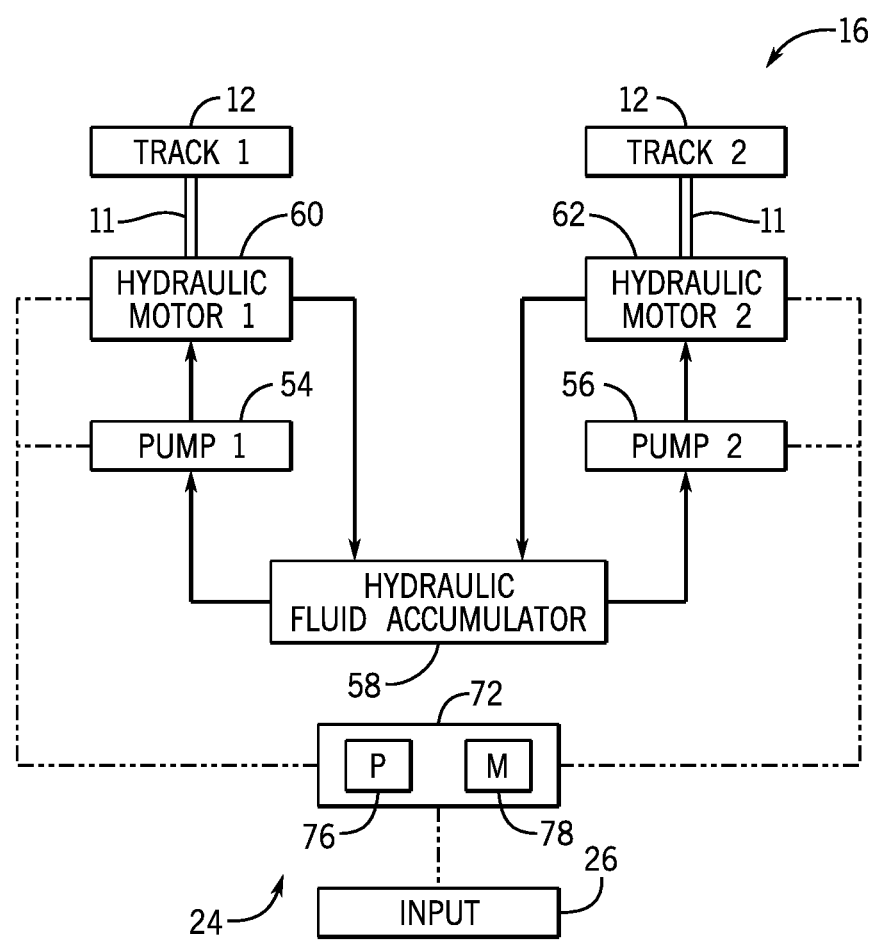
FIG. 2 is a schematic diagram of a hydraulic system that may be used in the work vehicle of FIG. 1, in accordance with an embodiment of the present disclosure.

FIG. 2 is a schematic diagram of an embodiment of the hydraulic system 16 and the hydraulic control system 24 that may be used in a work vehicle, such as in the work vehicle 10 of FIG. 1. The hydraulic system 16 may include a first hydraulic pump 54 and a second hydraulic pump 56 that receive hydraulic fluid from a hydraulic accumulator or source 58. The first pump 54 pressurizes the hydraulic fluid and provides the pressurized hydraulic fluid to the first hydraulic motor 60. The second pump 56 pressurizes the hydraulic fluid and provides the pressurized hydraulic fluid to a second hydraulic motor 62. The hydraulic motors 60, 62 have discrete volumes associated with respective discrete speed shifts (e.g., two discrete volumes associated with two discrete speed shifts). As the hydraulic motors 60, 62 receive the pressurized hydraulic fluid, the hydraulic motors 60, 62 drive rotation of respective first and second wheels 11. The wheels 11 in turn may couple to and rotate first and second vehicle tracks 12 to drive the work vehicle to move. It should be understood, that the hydraulic system 16 may be modified to include a different number of pumps, hydraulic motors, wheels, and/or tracks (e.g., 1, 2, 3, 4, or more). Furthermore, in FIG. 2, the hydraulic fluid is shown as returning from the hydraulic motors 60, 62 to the hydraulic accumulator or fluid source 58 to facilitate discussion. However, it should be appreciated that the hydraulic fluid may return directly to the hydraulic pumps 54, 56, and optionally with a small portion of the hydraulic fluid recirculating back to the hydraulic accumulator or fluid source 58 (e.g., for cooling).

In order to provide enhanced functionality and additional speed ranges, the hydraulic control system 24 couples to the hydraulic system 16. More specifically, the hydraulic control system 24 couples to and controls operation of the first and second pumps 54, 56 and the first and second hydraulic motors 60, 62. The hydraulic control system 24 controls operation of the hydraulic pumps 54, 56 and the hydraulic motors 60, 62 to provide any number of speed ranges in an adjustable manner (e.g., a number of speed ranges between a minimum speed and a maximum speed of the work vehicle is adjustable by the operator). In this way, the hydraulic control system 24 may enable the operator to set a first number of speed ranges for a first work operation during a first time period and a second number of speed ranges for a second work operation during a second time period. In other words, the hydraulic control system 24 enables the operator to add virtual gears to mechanical gears via the one or more input devices 26.

As shown, the hydraulic control system 24 includes a controller 72 that receives signals (e.g., command signals) from the one or more input devices 26. As an example, prior to a first work operation, the operator may utilize the one or more input devices 26 (e.g., the touchscreen display) to select a first number of speed ranges (e.g., to add virtual gears). Then, during the first work operation, the operator may utilize the one or more input devices 26 (e.g., the touchscreen display or a switch) to select a respective first speed range within the first number of speed ranges, and then the operator may utilize the one or more input devices 26 (e.g., the joystick) to drive the work vehicle within the respective first speed range within the first number of speed ranges. At another time during the first work operation, the operator may utilize the one or more input devices 26 (e.g., the touchscreen display or the switch) to select a respective second speed range within the first number of speed ranges (e.g., to shift), and then the operator may utilize the one or more input devices 26 (e.g., the joystick) to drive the work vehicle within the respective second speed range within the first number of speed ranges.

Prior to a second work operation, the operator may utilize the one or more input devices 26 (e.g., the touchscreen display) to select a second number of speed ranges (e.g., to remove the virtual gears). Then, during the second work operation, the operator may utilize the one or more input devices 26 (e.g., the touchscreen display or the switch) to select a respective first speed range within the second number of speed ranges, and then the operator may utilize the one or more input devices 26 (e.g., the joystick) to drive the work vehicle within the respective first speed range of the second number of speed ranges. At another time during the second work operation, the operator may utilize the one or more input devices 26 (e.g., the touchscreen display or the switch) to select a respective second speed range within the second number of speed ranges (e.g., to shift), and then the operator may utilize the one or more input devices 26 (e.g., the joystick) to drive the work vehicle within the respective second speed range within the second number of speed ranges, and so on. In this way, the operator may select/adjust the number of speed ranges (e.g., at the beginning of a work operation) and may also select/shift between speed ranges of the number of speed ranges (e.g., during the work operation).

In this example, the first number of speed ranges (e.g., with the virtual gears) may be greater than the second number of speed ranges (e.g., without the virtual gears). Furthermore, the respective first speed range within the first number of speed ranges may include different speeds than the respective first speed range within the second number of speed ranges. This is because the minimum speed and the maximum speed for the work vehicle may remain unchanged; however, the number of speed ranges available between the minimum speed and the maximum speed for the work vehicle may vary, thereby resulting in at least some differences in the speeds available within at least some of the ranges (e.g., a respective lowest speed range within a higher number of speed ranges may be narrower than a respective lowest speed range within a lower number of speed ranges).

As discussed in more detail below, the controller 72 receives and processes signals (e.g., shift commands) from the one or more input devices 26 and executes instructions stored on a memory 78 to control operation of the pumps 54, 56 (e.g., via pump commands) and the hydraulic motors 60, 62 (e.g., via motor commands) to drive the work vehicle in this way. The processor 76 may be a microprocessor that executes software that enables control of the hydraulic system 16. The processor 76 may include multiple microprocessors, one or more "general-purpose" microprocessors, one or more special-purpose microprocessors, and/or one or more application specific integrated circuits (ASICs), field-programmable gate arrays (FPGAs), or some combination thereof. For example, the processor 76 may include one or more reduced instruction set computer (RISC) processors. The memory 78 may include a volatile memory, such as random access memory (RAM), and/or a nonvolatile memory, such as read-only memory (ROM). The memory 78 may store a variety of information and may be used for various purposes. For example, the memory 78 may store processor executable instructions, such as firmware or software, for the processor 76 to execute. The memory 78 may include ROM, flash memory, a hard drive, or any other suitable optical, magnetic, or solid-state storage medium or a combination thereof The memory 78 may store data, instructions, and any other suitable data.

Figure 3:
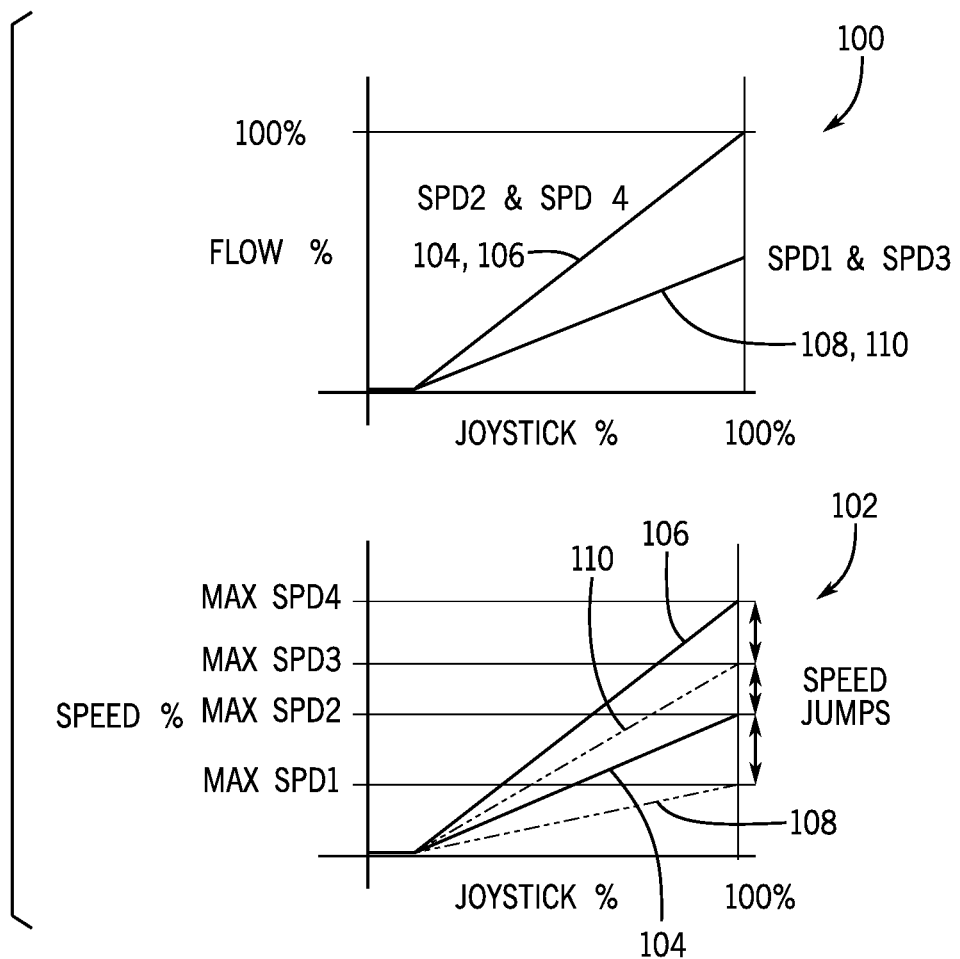
FIG. 3 illustrates graphs that represent operational features of the hydraulic system of FIG. 2, in accordance with an embodiment of the present disclosure.

FIG. 3 illustrates graphs that represent operational features of the hydraulic control system 24 of FIG. 2, in accordance with an embodiment of the present disclosure. A first graph 100 illustrates a joystick position percentage along an x-axis and a hydraulic fluid flow percentage along a y-axis. A second graph 102 illustrates a joystick position percentage along an x-axis and a speed percentage along a y-axis.

During some operations (e.g., a first work operation), the hydraulic control system may operate the hydraulic system with two speed ranges (e.g., Speed Range 2, indicated by line 104; Speed Range 4, indicated by line 106). At Speed Range 2, a motor volume of the hydraulic motor may be set to a first motor volume, and a pump displacement limit for the hydraulic pump may be set to a first limit (e.g., 100 percent). At Speed Range 4, the motor volume of the hydraulic motor may be set to a second motor volume (e.g., different than the first motor volume; less than the first motor volume, such as 50 percent of the first motor volume), and the pump displacement limit for the hydraulic pump may be set (e.g., maintained) at the first limit. In the illustrated graphs 100, 102, the Speed Range 2 and the Speed Range 4 may represent first settings (e.g., default settings; two-speed operation) that may be used while the virtual gears and their corresponding speed ranges are inactive (e.g., not selected or enabled).

During other operations (e.g., a second work operation), the hydraulic control system 24 may operate the hydraulic system with additional speed ranges, such as four speed ranges (e.g., Speed Range 1, indicated by line 108; Speed Range 2, indicated by line 104; Speed Range 3, indicated by line 110; Speed Range 4, indicated by line 106). At Speed Range 1, the motor volume of the hydraulic motor may be set to the first motor volume, and the pump displacement limit may be set to a second limit (e.g., less than the first limit, such as 50 percent of the first limit). At Speed Range 3, the motor volume of the hydraulic motor may be set to the second motor volume, and the pump displacement limit may be set to the second limit.

In the illustrated graphs 100, 102, the Speed Range 1 and the Speed Range 3 may represent speed ranges achieved via virtual gears (e.g., by activation, selection, or enablement of the virtual gears). Thus, in some embodiments, the hydraulic system may include a two-speed hydraulic motor (e.g., adjustable between the first motor volume and the second motor volume to provide the Speed Range 2 and the Speed Range 4), and the hydraulic control system may coordinate control of the two-speed hydraulic motor and the hydraulic pump (e.g., adjustable between the first displacement limit and the second pump displacement limit to provide the Speed Range 1 and the Speed Range 3) to provide additional speed ranges (e.g., Speed Range 1, Speed Range 2, Speed Range 3, Speed Range 4, or any combination thereof).

Figure 4:
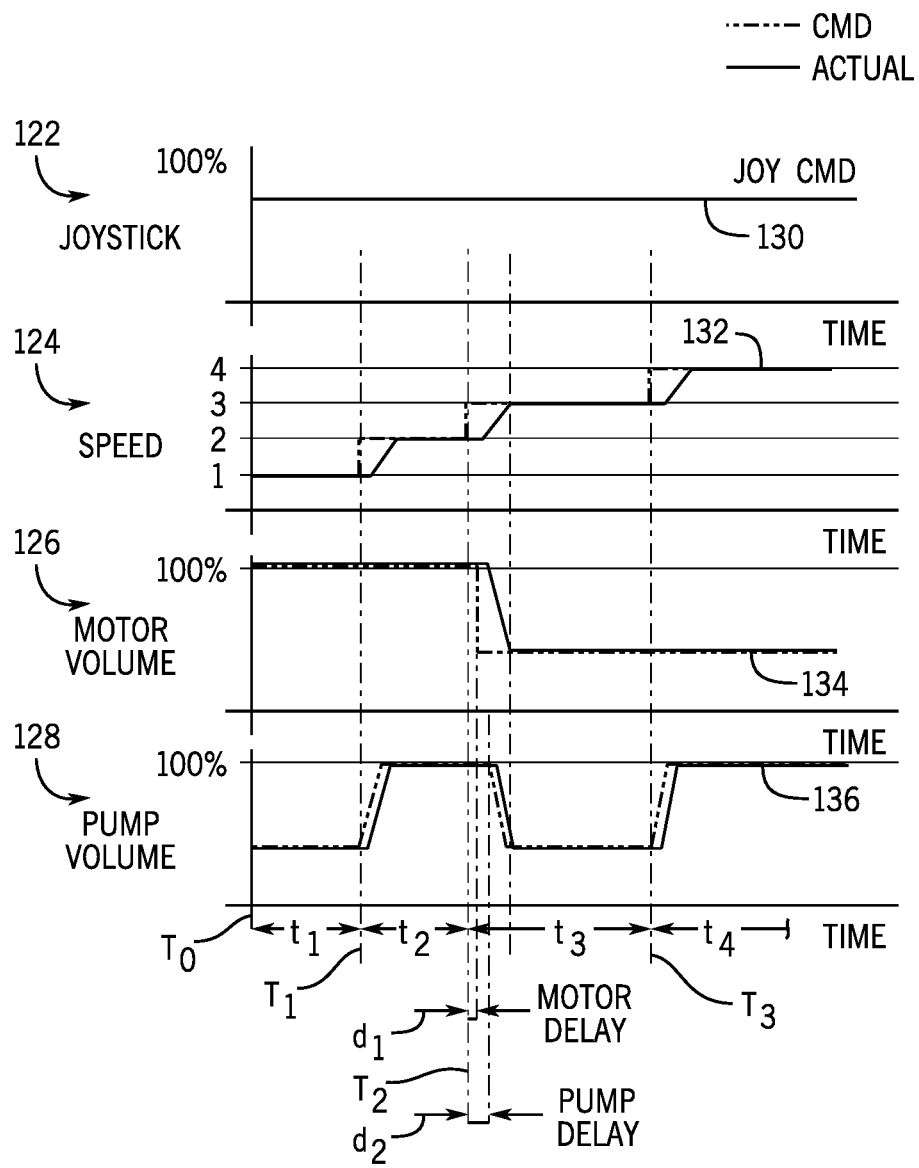
FIG. 4 illustrates graphs that represent operational features of the hydraulic system of FIG. 2 over time, in accordance with an embodiment of the present disclosure.

FIG. 4 illustrates graphs that represent operational features of the hydraulic control system 24 of FIG. 2 over time, in accordance with an embodiment of the present disclosure. The graphs illustrate different inputs or responses with respect to time, which is shown along an x-axis. In particular, a first graph 122 illustrates an input command (e.g., joystick command; a joystick position percentage) along a y-axis relative to the time along the x-axis. A second graph 124 illustrates a change in speed of the work vehicle along a y-axis relative to the time along the x-axis. The third graph 126 illustrates a change in a motor volume of the hydraulic motor along a y-axis relative to the time along the x-axis. A fourth graph 128 illustrates a change in a pump volume of the hydraulic pump (which affects the flow rate of the hydraulic fluid to the hydraulic motor and is limited by the pump displacement limit) along a y-axis relative to the time along the x-axis. In the graphs 122, 124, 126, 128, certain commanded actions (e.g., motor volume command to adjust the motor volume; pump action command to adjust the pump volume) are represented by dashed lines that extend along the x-axis, and actual changes (e.g., in speed, volume) are represented by solid lines that extend along the x-axis. Additionally, certain inputs that occur at certain times (e.g., to shift, to adjust the volume) are represented by dotted lines that extend along the y-axis (e.g., vertically through the graphs 122, 124, 126, 128) to facilitate discussion and to more clearly illustrate features of the present disclosure.

As noted above, these graphs 122, 124, 126, 128 include various lines that illustrate the input command into the hydraulic system via the one or more input devices, responses of the hydraulic system to commands that change motor volume and/or pump volume, as well as how the changes in the motor volume and/or the pump volume affect the speed of the work vehicle. For purposes of discussion, the hydraulic system has been set to have four speed ranges (e.g., illustrated as 1, 2, 3, and 4 in the graph 124; corresponding to FIG. 3), although the hydraulic system may be set to have more or less speed ranges. As discussed herein, the operator may set the hydraulic system to have the four speed ranges prior to the work operation, such as upon powering on the work vehicle or at any other time. Then, during the work operation, the operator may provide a shift command to shift to select one of the speed ranges of the four speed ranges. Then, during the work operation, the operator may provide the input command to adjust the speed within the selected speed range (e.g., current speed range or gear).

The first graph 122 includes a line 130 that illustrates the input command (e.g., provided based on the joystick position percentage) to control the speed of the work vehicle within the selected speed range. The hydraulic control system (e.g., the controller) receives this input command signal and generates a speed command signal to adjust the speed of the work vehicle within the selected speed range (e.g., by increasing the flow of hydraulic fluid, as constrained by the limit on the pump displacement). Because the input command is shown at a maximum (e.g., 100 percent of the joystick position; at a maximum position of the joystick) for the purposes of discussion, the speed of the work vehicle is shown to adjust to a maximum speed within the selected speed range. This is shown in the second graph 124, which illustrates a line 132 that represents the change in the speed of the work vehicle.

As mentioned above, the third graph 126 includes a line 134 that illustrates the motor volume of the hydraulic motor. As shown, the motor volume may be a first motor volume (e.g., 100 percent) or a second motor volume (e.g., less than the first motor volume, such as 50 percent of the first motor volume). The fourth graph 128 includes a line 136 that illustrates the pump volume of the hydraulic pump. As shown, the pump volume may be limited by a first limit (e.g., 100 percent) or by a second limit (e.g., less than the first limit, such as 50 percent of the first limit). It should be appreciated that additional limits (e.g., 25 percent, 75 percent) may be provided to increase the number of gears and their corresponding speed ranges for the work vehicle. It should be appreciated that the limit may be described herein as limiting pump displacement and/or limiting pump volume and/or limiting the flow rate of hydraulic fluid, as the result of each is the limiting of the flow rate of hydraulic fluid. As noted above, the input command is at the maximum in this example, and thus, the pump volume is shown to adjust to the first limit and to the second limit. However, in operation, the pump volume may vary up to the respective limit for the selected speed range and based on the input command. Generally, the hydraulic control system may adjust the motor volume and the limit for the pump volume to provide the four different speed ranges for the work vehicle.

As an example, at a time point, $T_0$, the operator may select a first gear (e.g., virtual gear) that corresponds to a first speed range (e.g., lowest speed range). Then, during a first time period, $t_1$, the motor volume may be the first motor volume (e.g., 100 percent) and the pump volume may be set to have the second limit (e.g., 50 percent) to thereby make the first speed range available to the work vehicle. Then, when the operator moves the input device to the maximum (e.g., maximum position of the joystick), the speed of the work vehicle may be at the respective maximum speed of the first speed range.

At a time point, $T_1$, the operator may provide an input to shift to a second gear (e.g., a mechanical gear; remove the overlaid virtual gear) that corresponds to a second speed range. In response to the input to shift to the second gear, during a second time period, $t_2$, the motor volume may be maintained at the first motor volume (e.g., 100 percent) and the pump volume may be set to have the first limit (e.g., 100 percent) to thereby make the second speed range available for the work vehicle. Then, when the operator moves the input device to the maximum, the speed of the work vehicle may move to and be held at the respective maximum speed of the second speed range. As shown, upon the input to shift to the second gear, the pump volume may increase over time until the first limit on the pump volume is reached, which results in the speed of the work vehicle increasing over time to the maximum speed of the second speed range. This may provide for a smooth transition between speeds as the operator shifts the gears (including the virtual gears) for the work vehicle.

At a time point, $T_2$, the operator may provide an input to shift to a third gear (e.g., a virtual gear) that corresponds to a third speed range. In response to the input to the shift to the third gear, during a third time period, $t_3$, the motor volume may be decreased to the second motor volume (e.g., 50 percent) and the pump volume may be decreased to fall within the second limit for the pump volume (e.g., 50 percent) to thereby make the third speed range available for the work vehicle. Then, when the operator moves the input device to the maximum, the speed of the work vehicle may move to and be held at the respective maximum speed of the third speed range. As shown, upon the input to shift to the third gear, the motor volume and the pump volume may decrease over time, which results in the speed of the work vehicle increasing over time to the maximum speed of the third speed range.

In some embodiments, following the shift (e.g., the shift command) at the time point, $T_2$, there may be a delay prior to a respective motor command to change the motor volume and/or prior to a respective pump command to change the pump volume. For example, the respective motor command to decrease the motor volume may be provided after a first delay period, $d_1$, (e.g., motor delay period), and the respective pump command to decrease the pump volume may be provided after a second delay period, $d_2$, (e.g., pump delay period). In some embodiments, the first delay period, $d_1$, and the second delay period, $d_2$, may be the same (e.g., zero difference). In some embodiments, the first delay period, $d_1$, and the second delay period, $d_2$, may be different from one another, such as to account for whether the hydraulic motor or the hydraulic pump takes longer to respond to their respective command. The first delay period, $d_1$, and the second delay period, $d_2$, may be selected to provide for simultaneous (e.g., essentially simultaneous and/or overlapping in time) changes in the motor volume and the pump volume, which may provide for a smoother transition between speeds as the operator shifts the gears (including the virtual gears) for the work vehicle.

At a time point, $T_3$, the operator may provide an input to shift to a fourth gear (e.g., a mechanical gear; remove the overlaid virtual gear) that corresponds to a fourth speed range. In response to the input to the shift to the fourth gear, during a fourth time period, $t_4$, the motor volume may be maintained at the second motor volume (e.g., 50 percent) and the pump volume may be increased up to the first limit (e.g., 100 percent) to thereby make the fourth speed range available for the work vehicle. Then, when the operator moves the input device to the maximum, the speed of the work vehicle may move to and be held at the respective maximum speed of the fourth speed range. As shown, upon the input to shift to the fourth gear, the pump volume may increase over time up to the first limit for the pump volume, which results in the speed of the work vehicle increasing over time to the maximum speed of the fourth speed range. This may provide for a smooth transition between speeds as the operator shifts the gears (including the virtual gears) for the work vehicle.

It should be appreciated that in response to the input to shift the speed range for the work vehicle, the hydraulic control system generates the motor command and/or the pump command. These commands are sent to the hydraulic motor(s) and hydraulic pump(s), respectively, and change the volume of the hydraulic motor(s) and the limit for the volume of hydraulic fluid pumped by the hydraulic pump(s), respectively. As discussed above and as illustrated, these changes may be rapid changes, but are not instantaneous jumps. For example, there may be a rapid linear change (e.g., with a non-zero slope) between the first motor volume and the second motor volume. While four speed ranges are illustrated, it should be appreciated that additional speed ranges may be added or one or more of the four speed ranges may be omitted (e.g., based on the input by the operator). That is, the operator may use any one, two, or three of the four speed ranges shown in FIG. 4 and/or the operator may add other speed ranges other than the four speed ranges shown in FIG. 4.

Figure 5:
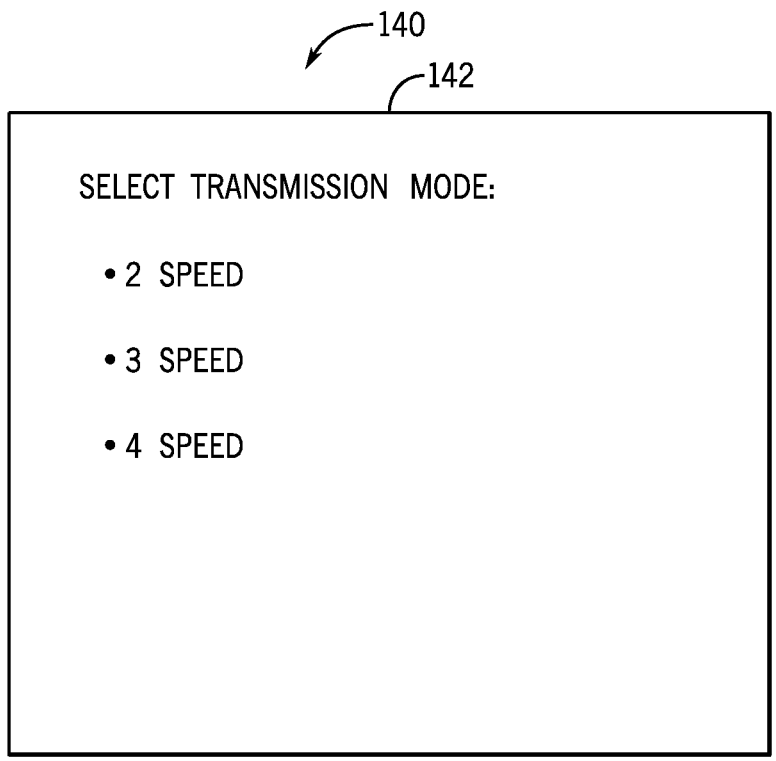
FIG. 5 illustrates a graphical user interface that may be presented to facilitate user selection of a number of gears and corresponding speed ranges for the hydraulic system of FIG. 2, in accordance with an embodiment of the present disclosure.
Figure 6:
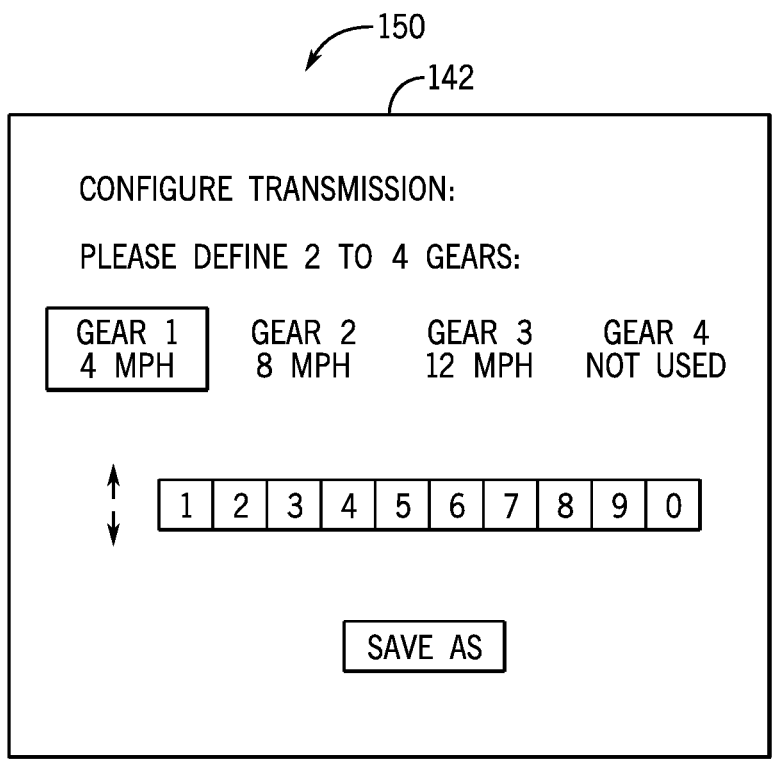
FIG. 6 illustrates a graphical user interface that may be presented to facilitate user input to configure the hydraulic system of FIG. 2, in accordance with an embodiment of the present disclosure.

FIGS. 5 and 6 illustrate examples of graphical user interfaces that may be utilized to facilitate configuration of the hydraulic system by the operator. For example, as shown in FIG. 5, a graphical user interface 140 may be provided via a display screen 142, which may be within the cab of the work vehicle. The graphical user interface 140 may be provided to the operator in response to a request by the operator and/or at any other time (e.g., automatically each time the work vehicle is powered on). The graphical user interface 140 may provide a list of available transmission modes, such as a two-speed mode, a three-speed mode, or a four-speed mode. These may be saved modes with corresponding speed ranges (e.g., in the memory of the hydraulic control system; set at manufacturing and/or previously set by the operator).

The display screen 142 may be a touchscreen that is configured to receive inputs from the operator, and in such cases, the operator may select a particular transmission mode by touching the display screen 142. However, it should be appreciated that the input may be provided in any of a variety of other ways, such as by using auxiliary devices (e.g., a keyboard and/or a push button/dial) to move through the available transmission modes and to select one of the available transmission modes. The graphical user interface 140 may also include selectable icons and/or may operate as a menu to thereby enable the operator to select one of the transmission modes to view additional information (e.g., the speed ranges, including a maximum speed of each of the speed ranges) and/or to adjust characteristics of the transmission modes (e.g., to adjust the speed ranges, including the maximum speed of each of the speed ranges). It should be appreciated that additional information, such as the speed set points) may be provided as part of the list of available transmission modes in the graphical user interface 140 as well.

As shown in FIG. 6, a graphical user interface 150 may be provided via the display screen 142. The graphical user interface 150 may be provided to the operator in response to a request by the operator and/or at any other time (e.g., automatically each time the work vehicle is powered on; after selection of the transmission mode and/or the number of speed ranges). The graphical user interface 150 may provide a list or a table of gears, as well as associated speed ranges (e.g., the maximum speed) for each of the gears.

As noted above, the display screen 142 may be a touchscreen that is configured to receive inputs from the operator, and in such cases, the operator may select icons (e.g., up arrows, down arrows, numbers) presented on the display screen 150. However, it should be appreciated that the input may be provided in any of a variety of other ways, such as by using auxiliary devices (e.g., a keyboard and/or a push button/dial) to type and/or enter the speed ranges. The graphical user interface 150 may provide a selectable icon to facilitate saving the speed ranges for future use (e.g., to be presented in a list of available transmission modes, such as in the list of FIG. 5, at a later time). For example, the operator may save a first configuration with three gears that correspond to three speed set points (e.g., 4 miles per hour (MPH), 8 MPH, and 12 MPH) as "Basement Dig," and the operator may save a second configuration with two gears that correspond to two speed set points (e.g., 6 MPH and 12 MPH) as "Long Haul." Then, these configurations may be provided in the list of available transmission modes, such as by providing their operator-provided names (e.g., "Basement Dig") and/or the characteristics (e.g., the number of gears and the speed set points).

It should be appreciated that other information may be displayed to the operator, such as on the display screen 142. During operation, the current gear and/or the current speed range, as well the available gears and/or the available speed ranges, may be displayed to the operator on the display screen 142. Furthermore, the hydraulic system may enable the operator to select the number of gears and speed ranges via a switch (e.g., a 2-way, 3-way, 4-way switch; rotary switch or dial) that is switchable between discrete positions that correspond to a respective number of gears and speed ranges. The switch may be physical components that are provided within the cab of the work vehicle, although the switch may instead be virtual components that are displayed on the display screen 142.

In this way, the operator may configure the hydraulic system as desired for certain operations. For example, the two-speed transmission mode may be desirable for certain operations where fine speed control is not needed and where the operator prefers to limit shifting. However, a three-speed transmission mode, a four-speed transmission mode, or other transmission modes may be desirable for certain operations where fine speed control is beneficial and where the operator is willing to carry out multiple shifts in order to achieve the fine speed control. While two-speed, three-speed, and four-speed operations are illustrated and described in detail, it should be appreciated that the disclosed embodiments may be adapted for five-speed operations, six-speed operations, or more. For example, additional motor volumes and/or pump volumes may be provided. Furthermore, the disclosed techniques may be adapted for use with a hydraulic transmission and a variable motor. In such cases, the motor volume and the pump volume would be remapped in response to each re-configuration of the hydraulic system. Furthermore, the disclosed techniques may be adapted for use with a hydraulic transmission and a fixed displacement motor (e.g., no command is provided to the motor). In such cases, the pump volume would be changed to provide different speed ranges. Indeed, the disclosed techniques may be adapted for use with any hydraulic, electric, or mechanical transmission.

Technical effects of the disclosure include a hydraulic control system that provides a variable, configurable number of speed ranges for a work vehicle. The operator may use full motion of the input device (e.g., joystick, between its minimum and maximum positions) within each gear and speed range of the selected number of speed ranges for the work vehicle. The minimum and maximum speed available to the work vehicle may remain the same regardless of the selected number of gears and speed ranges for the work vehicle. For example, changing the number of gears and speed ranges does not involve increasing or decreasing the speed available to the work vehicle (e.g., decreasing the number of gears and speed ranges does not involve removing the highest gear and the highest speed range, but instead provides fewer gears between the lowest gear and the highest gear and fewer speed ranges between the lowest speed range and the highest speed range; the hydraulic system does not create four gears and speed ranges and then operate by excluding some of the four gears and speed ranges). Instead, changing the number of gears and speed ranges increases or decreases a number of shifts that are used to move from the minimum and maximum speed for the work vehicle.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A hydraulic system for a work vehicle, the hydraulic system comprising:
   a hydraulic motor configured to generate rotational power for one or more wheels on the work vehicle;
   a hydraulic pump coupled to the hydraulic motor, wherein the hydraulic pump is configured to pump hydraulic fluid to the hydraulic motor; and
   a hydraulic control system comprising a processor that is configured to:
      receive an input indicative of a selection of a number of speed ranges that span between a minimum speed and a maximum speed for the work vehicle;
      provide a respective motor command to set a motor volume of the hydraulic motor and a respective pump command to set a limit for a pump volume of the hydraulic pump to enable the number of speed ranges for the work vehicle;
      receive an additional input indicative of an additional selection of a different number of speed ranges, wherein the number of speed ranges and the different number of speed ranges span between the minimum speed and the maximum speed for the work vehicle; and provide a respective motor command to set the motor volume of the hydraulic motor and a respective pump command to set the limit for the pump volume of the hydraulic pump to enable the different number of speed ranges for the work vehicle.

2. The hydraulic system of claim 1, wherein the hydraulic motor is a two-speed motor and the number of speed ranges is four speed ranges.

3. The hydraulic system of claim 2, wherein the processor is configured to set the motor volume at a first motor volume and to adjust the limit for the pump volume between a first pump volume and a second pump volume while the motor volume is at the first motor volume to enable two lower speed ranges of the four speed ranges while the motor volume is at the first motor volume.

4. The hydraulic system of claim 3, wherein the processor is configured to set the motor volume at a second motor volume and to adjust the limit for the pump volume between the first pump volume and the second pump volume while the motor volume is at the second motor volume to enable two higher speed ranges of the four speed ranges while the motor volume is at the second motor volume.

5. The hydraulic system of claim 1, wherein the processor is configured to receive the input from an operator via one or more input devices within a cab of the work vehicle.

6. The hydraulic system of claim 5, wherein the one or more input devices comprise a switch that is switchable between discrete positions that each correspond to a different number of speed ranges that span between the minimum speed and the maximum speed for the work vehicle.

7. The hydraulic system of claim 1, wherein the processor is configured to output a graphical user interface that displays a list of available modes for the work vehicle, wherein the list of available modes comprises a first speed mode with the number of speed ranges and a second speed mode with the different number of speed ranges that span between the minimum speed and the maximum speed for the work vehicle.

8. The hydraulic system of claim 1, wherein the processor is configured to receive additional inputs that are indicative of a respective speed set point for each speed range of the number of speed ranges, and to set the motor volume and the limit for the pump volume to enable the respective speed set point for each speed range of the number of speed ranges for the work vehicle.

9. The hydraulic system of claim 8, wherein the processor is configured to receive further inputs indicative of a request to save the number of speed ranges for the work vehicle and the respective speed set point for each speed range of the number of speed ranges as a stored configuration in a memory accessible to the processor.

10. The hydraulic system of claim 9, wherein the processor is configured to retrieve the stored configuration from the memory and to output a graphical user interface to display the stored configuration in a list of available modes for the work vehicle to facilitate selection of the stored configuration by an operator.

11. The hydraulic system of claim 1, wherein the processor is configured to:

receive an additional input indicative of an additional selection of a first speed range of the number of speed ranges, and in response set the motor volume to a first motor volume and the limit to a first limit for the pump volume; and receive a further input indicative of a request to shift from the first speed range to a second speed range of the number of speed ranges, and in response maintain the motor volume at the first motor volume and set the limit to a second limit for the pump volume.

12. A hydraulic control system for a work vehicle, the hydraulic control system comprising a processor that is configured to:

receive a configuration input from an operator indicative of a selection of a first number of speed ranges that span between a minimum speed and a maximum speed for the work vehicle;

receive a first shift input from the operator indicative of a request to shift to a first speed range of the first number of speed ranges;

provide a pump command to set a limit for a pump volume to a first limit to enable the first speed range of the first number of speed ranges; and receive an additional configuration input from the operator indicative of an additional selection of a second number of speed ranges that span between the minimum speed and the maximum speed for the work vehicle.

13. The hydraulic control system of claim 12, wherein the processor is configured to:

receive a second shift input from the operator indicative of a second request to shift to a second speed range of the first number of speed ranges; and adjust the limit for the pump volume to a second limit to enable the second speed range of the first number of speed ranges.

14. The hydraulic control system of claim 12, wherein the processor is configured to output a graphical user interface to display a list of available modes for the work vehicle, wherein the list of available modes comprises a first speed mode with the first number of speed ranges and a second speed mode with the second number of speed ranges.

15. The hydraulic control system of claim 14, wherein the first number of speed ranges comprises four speed ranges, and the second number of speed ranges comprises two speed ranges.

16. The hydraulic control system of claim 14, wherein the first number of speed ranges enables the operator to command the work vehicle to move from the minimum speed to the maximum speed via a first number of shift inputs, and the second number of speed ranges enables the operator to command the work vehicle to move from the minimum speed to the maximum speed via a second number of shift inputs.

17. The hydraulic control system of claim 12, wherein the first number of speed ranges enables the operator to command the work vehicle to move from the minimum speed to the maximum speed via a first number of shift inputs, and the second number of speed ranges enables the operator to command the work vehicle to move from the minimum speed to the maximum speed via a second number of shift inputs.

18. A method of operating a hydraulic system for a work vehicle, the method comprising:

receiving, at one or more processors, an input indicative of a selection of a first number of speed ranges that span between a minimum speed and a maximum speed for the work vehicle;

setting, using the one or more processors and in response to the input, a motor volume of a hydraulic motor and a limit for a pump volume of a hydraulic pump to enable the number of speed ranges;

receiving, at the one or more processors, an additional input indicative of an additional selection of a second number of speed ranges that span between the minimum speed and the maximum speed for the work vehicle; and setting, using the one or more processors and in response to the additional input, the motor volume of the hydraulic motor and the limit for the pump volume of the hydraulic pump to enable the second number of speed ranges.

19. The method of claim 18, comprising:

receiving, at the one or more processors, a further input indicative of a further selection of a first speed range of the first number of speed ranges for the work vehicle; and after setting the motor volume of the hydraulic motor and the limit for the pump volume to enable the first speed range of the first number of speed ranges for the work vehicle:

receiving, at the one or more processors, a drive command from one or more input devices within a cab of the work vehicle; and adjusting, using the one or more processors and in response to the drive command, the pump volume of the hydraulic pump within the limit for the pump volume of the hydraulic pump based on the drive command to enable an operator to drive the work vehicle at speeds within the first speed range of the first number of speed ranges for the work vehicle.

* * * * *